US010803681B2

(12) United States Patent
Ravi (10) Patent No.: US 10,803,681 B2
(45) Date of Patent: Oct. 13, 2020

(54) SERVER SIDE SECURITY PREVENTING SPOOFING OF VIN PROVISIONING SERVICE

(71) Applicant: HONDA MOTOR CO., LTD., Tokyo (JP)

(72) Inventor: Narendran Ravi, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 15/814,060

(22) Filed: Nov. 15, 2017

(65) Prior Publication Data

US 2019/0147668 A1 May 16, 2019

(51) Int. Cl.
| | |
|---|---|
| *G01M 17/00* | (2006.01) |
| *G07C 5/00* | (2006.01) |
| *G07C 5/08* | (2006.01) |
| *H04M 1/725* | (2006.01) |
| *H04W 12/00* | (2009.01) |

(Continued)

(52) U.S. Cl.
CPC ............ *G07C 5/008* (2013.01); *G06F 16/00* (2019.01); *G07C 5/0808* (2013.01); *H04L 63/1466* (2013.01); *H04M 1/72577* (2013.01); *H04W 12/00512* (2019.01); *H04W 12/1202* (2019.01); *H04L 67/12* (2013.01); *H04W 4/44* (2018.02); *H04W 4/80* (2018.02); *H04W 8/205* (2013.01); *H04W 12/0023* (2019.01); *H04W 12/06* (2013.01); *H04W 12/08* (2013.01); *H04W 84/005* (2013.01)

(58) Field of Classification Search
CPC ....... G07C 5/008; G07C 5/0808; G06F 16/00; H04L 63/1466; H04L 67/12; H04M 1/72577; H04W 4/44; H04W 4/80; H04W 12/08; H04W 12/06; H04W 8/205; H04W 12/1202; H04W 12/00512; H04W 84/005; H04W 12/0023
USPC ............ 701/29.6, 29, 32, 33; 370/328, 312; 717/170; 707/769
See application file for complete search history.

(56) References Cited

U.S. PATENT DOCUMENTS

| | | | |
|---|---|---|---|
| 9,367,968 B2* | 6/2016 | Giraud | G07C 5/008 |
| 9,604,651 B1* | 3/2017 | Amireddy | B60W 50/08 |

(Continued)

OTHER PUBLICATIONS

Han, K., et. al., Automotive Cybersecurity for In-Vehicle Communication. IQT Quarterly vol. 6, No. 1, pp. 22-25.

(Continued)

*Primary Examiner* — Shardul D Patel
(74) *Attorney, Agent, or Firm* — Arent Fox LLP (57) ABSTRACT

Systems and methods for preventing spoofing of vehicle identification number (VIN) provisioning service. The system includes a memory that stores instructions for executing processes for preventing spoofing of vehicle identification number (VIN) provisioning service. The system also includes a processor configured to execute the instructions. The instructions cause the processor to receive enrollment information including a VIN and a hardware identifier for enrollment in a provisioning service for a vehicle. The instructions also cause the processor to verify whether the VIN is associated with the hardware identifier. The instructions further cause the processor to transmit a message to the vehicle based on the verification of the VIN being associated with the hardware identifier.

15 Claims, 6 Drawing Sheets

(51) Int. Cl.
*H04L 29/06* (2006.01)
*G06F 16/00* (2019.01)
*H04W 12/12* (2009.01)
*H04W 8/20* (2009.01)
*H04W 12/06* (2009.01)
*H04W 12/08* (2009.01)
*H04W 4/80* (2018.01)
*H04W 4/44* (2018.01)
*H04L 29/08* (2006.01)
*H04W 84/00* (2009.01)

(56) References Cited

U.S. PATENT DOCUMENTS

| | | | | |
|---|---|---|---|---|
| 2009/0055044 | A1* | 2/2009 | Dienst | G06F 16/24 |
| | | | | 701/29.6 |
| 2009/0287370 | A1* | 11/2009 | Iwai | B60W 50/02 |
| | | | | 701/29.6 |
| 2012/0294238 | A1* | 11/2012 | Uhler | H04W 4/021 |
| | | | | 370/328 |
| 2013/0279392 | A1* | 10/2013 | Rubin | H04W 72/005 |
| | | | | 370/312 |
| 2014/0263628 | A1* | 9/2014 | McQuade | G07F 7/12 |
| | | | | 235/381 |
| 2014/0282470 | A1* | 9/2014 | Buga | G06F 8/65 |
| | | | | 717/170 |
| 2015/0193223 | A1* | 7/2015 | Cardamore | G06F 9/44 |
| | | | | 717/170 |
| 2016/0087804 | A1* | 3/2016 | Park | H04L 67/12 |
| | | | | 713/156 |
| 2016/0344747 | A1* | 11/2016 | Link, II | G06F 21/44 |
| 2017/0322791 | A1* | 11/2017 | Tiles | G06F 8/65 |
| 2018/0025392 | A1* | 1/2018 | Helstab | G06Q 30/0278 |
| | | | | 705/306 |
| 2018/0074813 | A1* | 3/2018 | Granda | B60W 50/00 |
| 2018/0113476 | A1* | 4/2018 | Giles | B60W 10/04 |
| 2018/0260822 | A1* | 9/2018 | Wells | G06Q 30/0185 |
| 2018/0276903 | A1* | 9/2018 | Rai | G01C 21/3697 |

OTHER PUBLICATIONS

Van, Roermund, T., "Secure Connected Cars for a Smarter World," NXP Semiconductors. Retreived from http://www.nxp.com/docs/en/white-paper/Secure-Connected-Cars-WP.pdf, 2015.

* cited by examiner

SERVER SIDE SECURITY PREVENTING SPOOFING OF VIN PROVISIONING SERVICE

TECHNICAL FIELD

The present disclosure relates to methods and systems for preventing spoofing of vehicle identification number (VIN) provisioning service.

BACKGROUND

After purchasing a vehicle, a user may enroll in a vehicle service that provides communications with service providers such as roadside assistance providers, communications providers, entertainment providers, etc. During enrollment of a desired service, a vehicle identification number (VIN) is verified and, if validated, linked with the desired service. In this case, validation of the VIN may be a verification that the VIN is not currently linked or activated with the desired service. Some users, however, have learned how to circumvent proper vehicle linking during the enrollment by spoofing the VIN. For example, some users may change an actual VIN of a vehicle to a fake VIN (e.g., a VIN not associated with the vehicle) by accessing a diagnostic screen of a vehicle and inputting the fake VIN. When enrolling in a vehicle service, the fake VIN may then be verified and, and if validated, linked with the desired service despite the vehicle not being associated with the VIN.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

The present disclosure relates to systems and methods for preventing spoofing of vehicle identification number (VIN) provisioning service. The system may include a memory that stores instructions for executing processes for preventing spoofing of vehicle identification number (VIN) provisioning service. The system may also include a processor configured to execute the instructions. The instructions may cause the processor to receive enrollment information including a VIN and a hardware identifier for enrollment in a provisioning service for a vehicle. The instructions also cause the processor to verify whether the VIN is associated with the hardware identifier. The instructions further cause the processor to transmit a message to the vehicle based on the verification of the VIN being associated with the hardware identifier.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings.

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
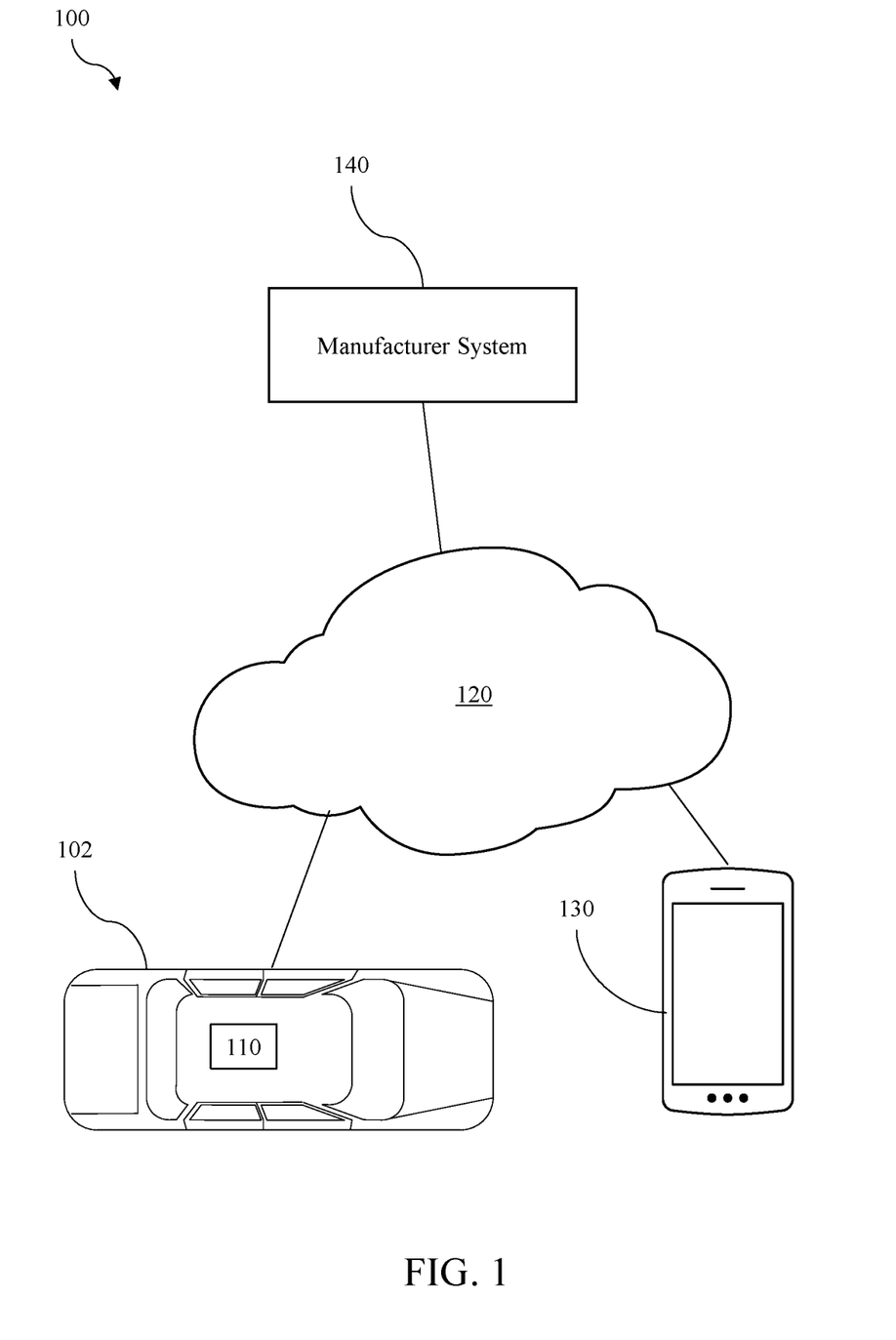
FIG. 1 illustrates an exemplary system for preventing VIN spoofing of a provisioning service according to aspects of the present disclosure.

Generally described, the present disclosure provides systems and methods for preventing spoofing of vehicle identification number (VIN) provisioning service. Turning to FIG. 1, an exemplary system 100 for preventing VIN spoofing of a provisioning service according to aspects of the present disclosure, is illustrated. As shown by FIG. 1, the system 100 may include a vehicle having a vehicle system 110, a network 120, a mobile device 130, and a manufacturer system 140. The network 120 may be a communications network that facilitates communications between multiple systems. For example, the network 120 may include the Internet or another Internet Protocol (IP) based network. The network 120 may enable the vehicle system 110 to communicate with a mobile device 130 or a manufacturer system 140. The network 120 may couple to the vehicle system 110, the mobile device 130, or the manufacturer system 140 via, for example, wired, wireless, or fiberoptic links.

The vehicle 102 may include a non-autonomous, semi-autonomous or autonomous vehicle. While shown as a car, the vehicle 102 may also be a motorcycle, truck, bus, airplane, boat, or other similar transportation vehicle. The vehicle system 110 within the vehicle 102 may communicate with the network 120 via a communication device, as described in more detail below. The vehicle system 110 may, for example, transmit/receive enrollment information to/from the mobile device 130 and/or the manufacturer system 140, as described below. The mobile device 130 may refer to any computer system including smartphones, tablets, laptops, personal computers (PCs), minicomputers, mainframe computers, microcomputers, telephonic devices, or other wireless devices, such as personal digital assistants ("PDAs") or a hand-held wireless devices capable of providing communication between the vehicle system 110, the mobile device 130, and the manufacturer system 140. The mobile device 130 may include an application used to assist a user in enrollment in a vehicle service. The manufacturer system 140 may include a system for enrolling a user on a vehicle service. The manufacturer system 140 may be hosted on a server or other platform.

While the system 100 is described to include a single vehicle system, mobile device, and manufacturer system, in other examples, systems and methods of the present disclosure are not limited to this aspect and may operate with one or more vehicle systems, one or more mobile devices, and one or more manufacturer system.

After purchasing the vehicle 102, a user may enroll in a vehicle service that provides communications with service providers such as roadside assistance providers, communications providers, entertainment providers, etc. To enroll in the vehicle service, the user may be required to show that the user is associated with the vehicle 102. The user may input personal information via an application on the mobile device 130 along with a VIN associated with the vehicle 102, to show association between the user and the vehicle 102. The application may transmit the VIN to the manufacturer system 140 for verification purposes. The manufacturer system 140 may then verify that the VIN is authorized to receive the requested vehicle service. For example, the manufacturer system 140 may verify that the VIN has not already been enrolled in the vehicle service. Once verified, the user may be prompted to pair the mobile device 130 with the vehicle 102 via a wireless connection, such as a Bluetooth® connection, between the mobile device 130 and the vehicle 102. When pairing, the vehicle 102 may associate the VIN received from the mobile device 130 with a head unit of the vehicle 102. Once the VIN and the head unit are associated, the pairing and enrollment process is complete.

Some users, however, are able to circumvent a proper enrollment process by spoofing a VIN. For example, some users may change an actual VIN of the vehicle 102 to a fake VIN (e.g., a VIN not associated with the vehicle 102) by accessing a diagnostic screen of the vehicle 102. When performing an enrollment process for the vehicle service, the fake VIN may be entered into the mobile device 130 and then be verified by the manufacturer system 140, and if validated, associated with the desired vehicle service despite the vehicle 102 not actually being associated with the fake VIN.

Figure 2:
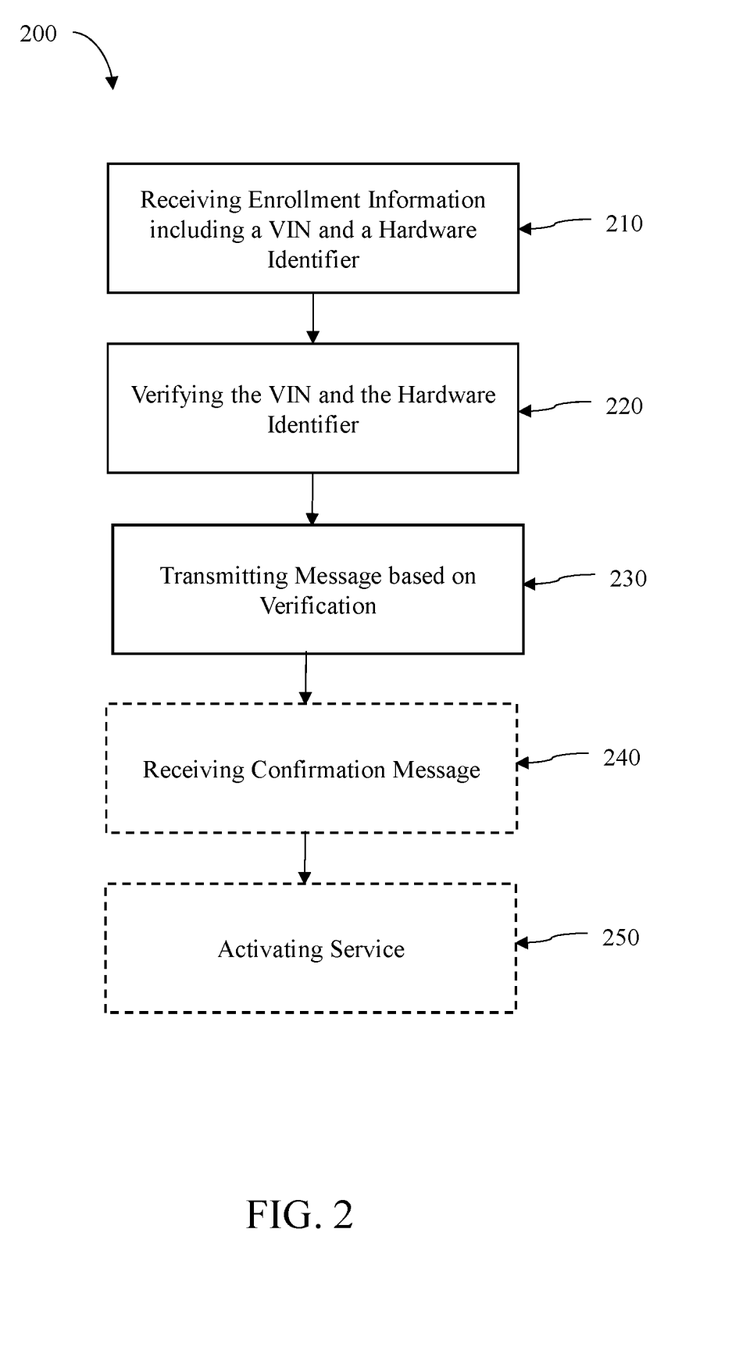
FIG. 2 illustrates a method for preventing VIN spoofing of a provisioning service according to aspects of the present disclosure.

FIG. 2 illustrates a method 200 for preventing VIN spoofing of a provisioning service, in accordance with aspects of the present invention. At the time of manufacturing the vehicle 102, the manufacturer may store a VIN and at least one unique hardware identifier associated with a hardware device installed in the vehicle 102. Examples of the unique hardware identifier may include an international mobile equipment identity (IMEI) or an international mobile subscriber identity (IMSI) associated with a vehicle communication device of the vehicle 102. An example of the hardware device of the vehicle 102 may include a vehicle communication device such as a telematics control unit. However, persons skilled in the art will recognize that other hardware identifiers, such as a unique identifier for a head unit of the vehicle 102 or a unique identifier for an electronic control unit (ECU) (see e.g., FIG. 5) of the vehicle 102, may be used.

As shown by FIG. 2, at 210, the manufacturing system 140 may receive enrollment information including a VIN and a hardware identifier. The enrollment information may have been transmitted from one or more of the vehicle system 110 or the mobile device 130 via the network 120. For example, the manufacturing system 140 may receive both the VIN and the hardware identifier from one of the vehicle system 110 or the mobile device 130. In another example, the manufacturing system 140 may receive one of the VIN or the hardware identifier from the vehicle system 110 and may receive the other one of the VIN or the hardware identifier from the mobile device 130.

Once both the VIN and the unique hardware identifier are received, at 220 the manufacturer system 140 may verify the received VIN and the received hardware identifier. For example, the manufacturer system 140 may compare the received VIN and hardware identifier with a database of information stored during manufacturing of vehicles. The database may include a list of VINs associated with each of the manufactured vehicles and may also indicate one or more hardware identifiers associated with each of the VINs. The manufacturing system 140 may verify that the received VIN is one of the listed VINS and that the received hardware identifier is one of the one or more hardware identifiers associated with the VIN.

At 230, the manufacturer system 140 may transmit a message based on a result of the verification of the VIN and the hardware identifier. In some examples, the manufacturer system 140 may transmit an error message to one or more of the vehicle system 110 or the mobile device 130 if the VIN and/or the hardware identifier fails verification. In some examples, the manufacturer system 140 may transmit an authorization code to one or more of the vehicle system 110 or the mobile device 130 if the VIN and/or the hardware identifier pass verification. In some examples, the authorization code may be digits and/or characters. The authorization code may be a code that is unique to the vehicle. In some aspects, the manufacturer system 140 may obtain the authorization code from a third party provider which provides the provisioning service. For example, if the VIN and/or the hardware identifier pass verification, the manufacturer system 140 may request for the authorization code from the third party provider and, once received, transmit the authorization code to one or more of the vehicle system 110 or the mobile device 130.

The verification code may be received and displayed by a head unit of the vehicle 102 and/or received and displayed by the mobile device 130. Once the verification code is received, a user may be prompted to confirm enrollment. Confirmation of enrollment may be performed by the user entering the verification code in the application on the mobile device 130. At 240, the manufacturer system 140 may receive a confirmation message in response to the user entering the verification code. The confirmation message may indicate that the user confirms enrollment. Once the confirmation message is received, at 250, the manufacturer system 140 may activate the provisioning service on the vehicle 102. In some aspects, the provisioning service may be activated by the third party provider. For example, the manufacturer system 140 may provide the confirmation message to the third party provider which, in turn, activates the provisioning service on the vehicle 102.

Figure 3:
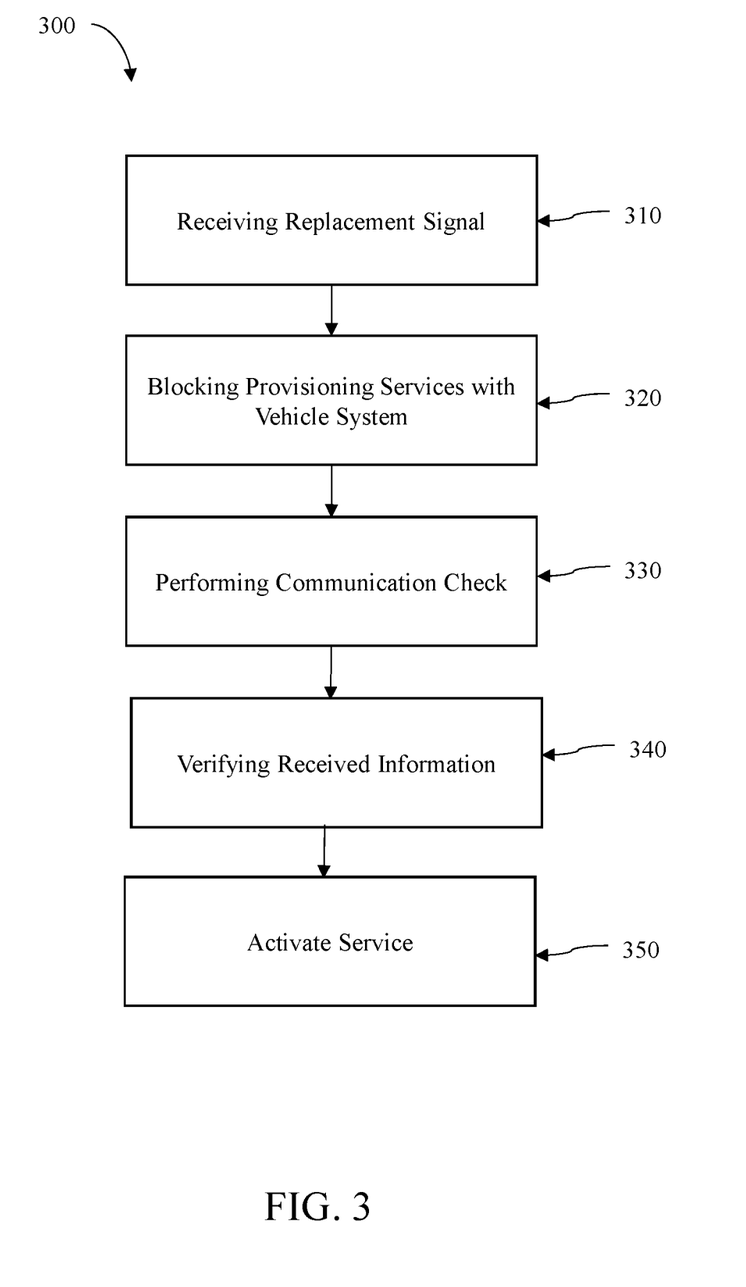
FIG. 3 illustrates another method for preventing VIN spoofing of a provisioning service according to aspects of the present disclosure.

FIG. 3 illustrates another method 300 for preventing VIN spoofing of a provisioning service, in accordance with aspects of the present invention. In some aspects, the manufacturer system 140 may also prevent VIN spoofing of a provisioning service when a hardware device is replaced in the vehicle 102. When a hardware device is removed and a new hardware device is installed in the vehicle 102, the vehicle system 110 may be triggered to transmit a hardware replacement signal to the manufacturer system 140. The hardware replacement signal may indicate a change of hardware devices. In some examples, the hardware device may be a vehicle communication device such as the telematics communication unit. However, persons skilled in the art will recognize that other hardware devices such as a head unit or ECU may trigger the hardware replacement signal being transmitted when these devices are replaced.

At 310, the manufacturer system 140 may receive the hardware replacement signal. The hardware replacement signal may include the VIN and a new unique hardware identifier. Upon receipt of the hardware replacement signal, the manufacturer system 140 may block provisioning services between the manufacturer system 140 and the vehicle system 110, at 320. The manufacturer system 140 may block the provisioning services until the new hardware device is verified.

At 330, the manufacturing system 140 performs a communication check. The communication check may detect the new hardware device in the vehicle 102 by communicating with the vehicle communication device of the vehicle 102. The communication may include a request for information, such as the VIN or the unique hardware identity, from the vehicle communication device.

At 340, the manufacturer system 140 may verify the received information, once a response to the request is received. In some examples, the manufacturer system 140 may compare the VIN and the new unique hardware identifier received in the hardware replacement signal with the VIN or the unique hardware identity from the communication check. In some examples, the manufacturer system 140 may compare the VIN and the new unique hardware identifier received in the hardware replacement signal with the VINs or the hardware identities stored in the database. In some aspects, the communication check may include verification of the received information by the third party provider. For example, the manufacturer system 300 may transmit the hardware replacement signal to the third party provider. The third party provider may then perform the communication check by confirming that the unique hardware identifier such as the IMEI or IMSI is not being used by other devices and/or vehicles.

At 350, the manufacturer system 140 may active the provisioning service when the unique hardware identifier has been verified. When activating the provisioning service, the manufacturer system 140 may store the new unique hardware identifier in the database and associate the new unique hardware identifier with the VIN of the vehicle 102. In some aspects, the provisioning service may be activated by the third party provider. For example, the manufacturer system 140 may provide the indicate to the third party provider that the unique hardware identifier has been verified and allow the third party provider to activate the provisioning service on the vehicle 102.

In an example, the manufacturer system 140 may include a computer system, as shown with respect to FIG. 4 (?) described below, associated with one or more vehicle manufacturers or dealers. The manufacturer system 140 may include one or more databases that store data related to provisioning services for the vehicle 102. The manufacturer system 140 may also include a memory that stores instructions for executing processes for preventing spoofing of a VIN provisioning service and a processor configured to execute the instructions.

Figure 4:
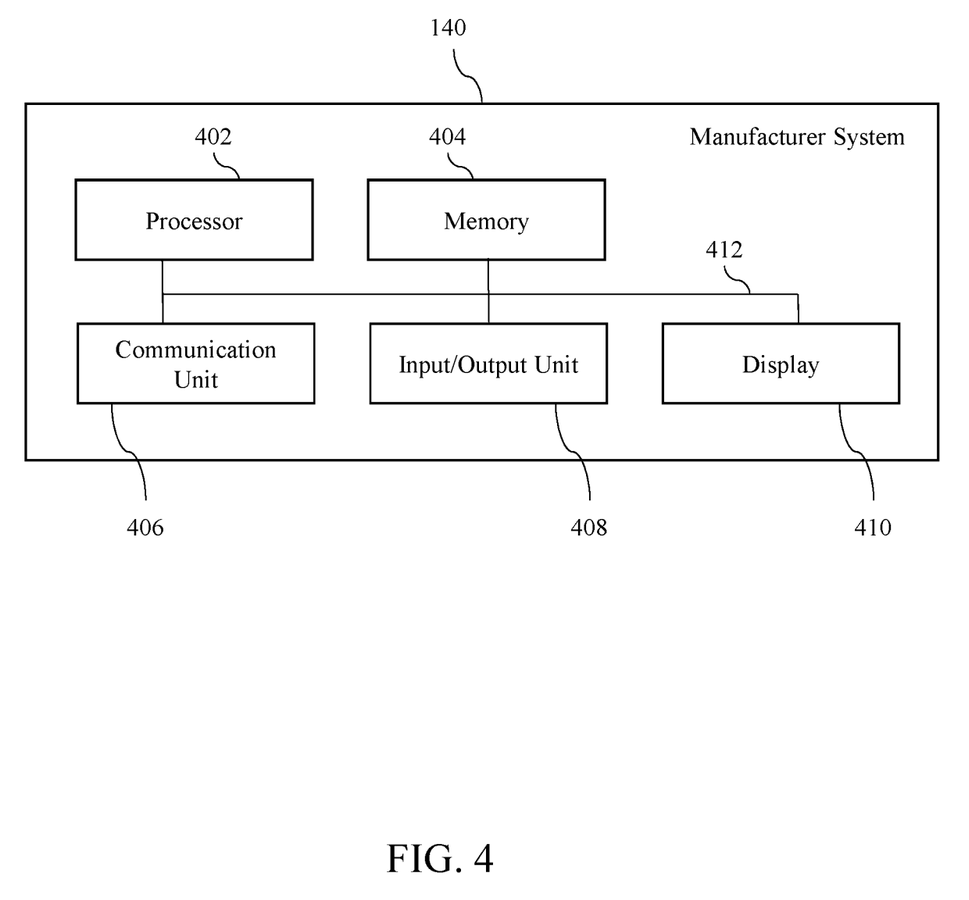
FIG. 4 illustrates a block diagram of exemplary components of a manufacturer system according to aspects of the present disclosure.

FIG. 4 illustrates a block diagram of exemplary components of the manufacturer system 140 in accordance with one aspect of the present disclosure. The manufacturer system 140 may one or more components including a processor 402, memory 404, communication unit 406, input/output unit 408, display 410, or a system bus 412. Each component may interact with one another through the system bus 412. Fewer or more components may be included within the manufacturer system 140.

The processor 402 may include one or more processors for executing instructions stored on the memory 404. For example, instructions may be typically stored in the memory 404 until they are ready for execution, at which time they may be accessed by the processor 402. Examples of the instructions may include instructions to perform the methods described above in regards to FIGS. 2 and 3. The processor 402 may select a part of memory 404 to read and/or write by using an address that the processor 402 gives to the memory 404 along with a request to read and/or write. The reading and interpretation of an encoded instruction at an address causes the processor 402 to fetch a subsequent instruction, either at a subsequent address or some other address.

The communication unit 406 may be used to communicate with the vehicle system 110, the mobile device 130, or third party providers via the network 120. Further, the communication unit 406 may provide services locally or remotely. Locally, the manufacturer system 140 may provide capabilities through its input/output unit 408 and display 410. Alternatively, the manufacturer system 140 may be a host service where other devices may access it to process or derive information. The devices may access information from the memory 404 through the manufacturer system 140.

Figure 5:
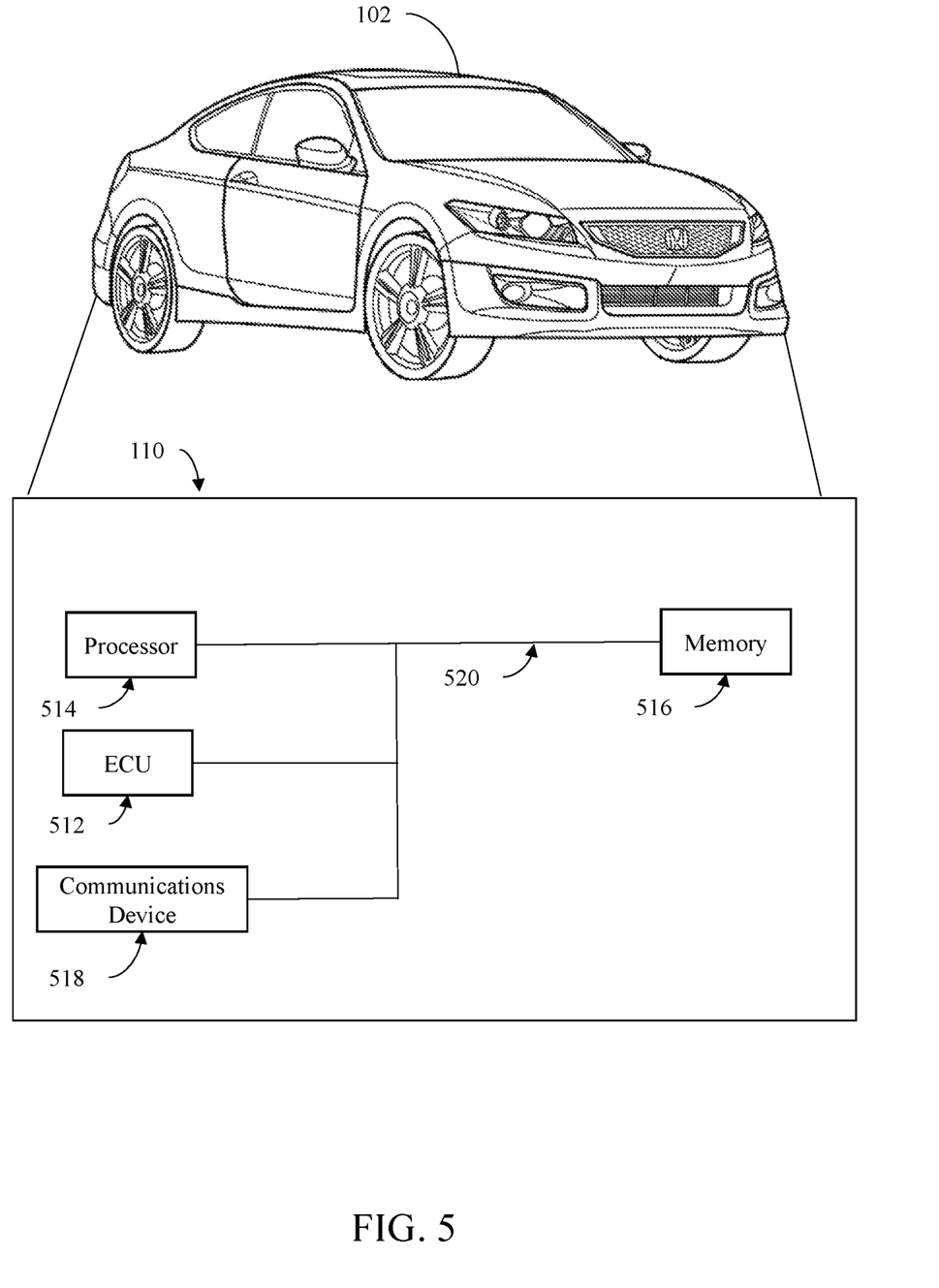
FIG. 5 illustrates a block diagram of exemplary components of a vehicle system according to aspects of the disclosure is provided

FIG. 5 illustrates a block diagram of exemplary components of the vehicle system 110 according to aspects of the disclosure. The vehicle system 110 may reside within the vehicle 102. The components of the vehicle system 110, as well as the components of other systems, hardware architectures, and software architectures discussed herein, may be combined, omitted or organized into various implementations.

The vehicle 102 may include an electronic control unit (ECU) 512 that operably controls a plurality of vehicle systems. The ECU 512 may include internal processing memory, an interface circuit, and bus lines for transferring data, sending commands, and communicating with the vehicle systems. The ECU 512 may include an internal processor and memory (not shown). The vehicle 102 may also include a bus 520 for sending data internally between the ECU 512 and various components of the vehicle systems. The vehicle systems may include, but are not limited to, the vehicle system 110, among others, including vehicle heating, ventilation, and air conditioning (HVAC) systems, vehicle audio systems, vehicle video systems, vehicle infotainment systems, vehicle telephone systems, and the like. The vehicle system 110 may include a processor 514 and memory 516 that communicate with the ECU 512.

The vehicle 102 may further include a communications device 518 (e.g., wireless modem) for providing wired or wireless computer communications utilizing various protocols to send/receive electronic signals with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 518 of the vehicle 102 may be operably connected for internal computer communication via a bus (e.g., a controller area network (CAN) or a local interconnect network (LIN) protocol bus) to facilitate data input and output between the ECU 512 and vehicle features and systems. In some aspects, the communications device 518 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®. In further aspects, the communications device 518 may be configured for remote communications with a manufacturer server.

Figure 6:
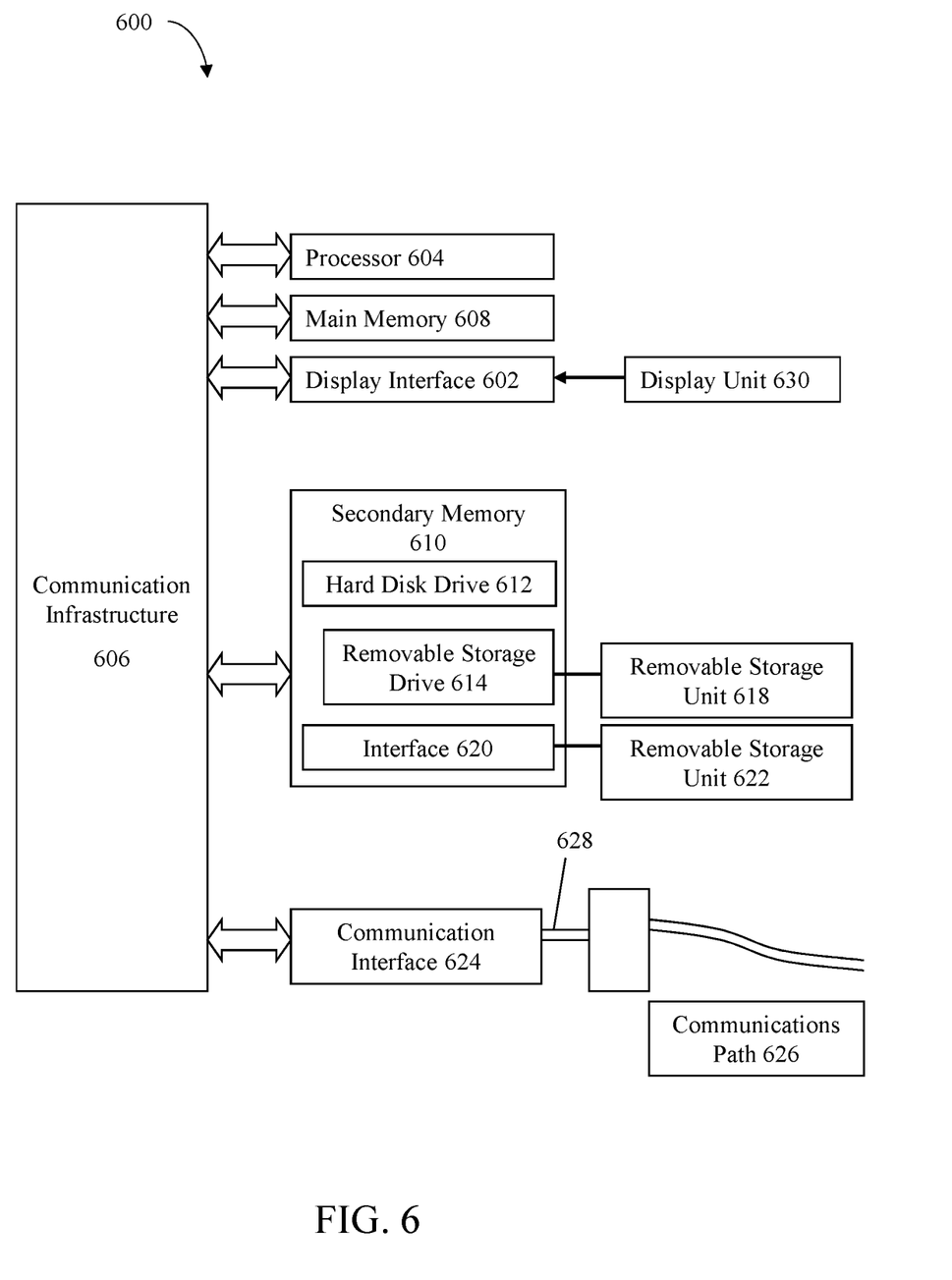
FIG. 6 illustrates a block diagram of a computer system according to aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality of the vehicle system 110 or the manufacturer system 140 described herein. An example of such a computer system 600 is shown in FIG. 6.

Computer system 600 includes one or more processors, such as processor 604. The processor 604 may be connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612, and/or a removable storage drive 614, representing a floppy disk drive, a magnetic tape drive, an optical disk drive, a universal serial bus (USB) flash drive, etc. The removable storage drive 614 reads from and/or writes to a removable storage unit 618 in a well-known manner. Removable storage unit 618 represents a floppy disk, magnetic tape, optical disk, USB flash drive etc., which is read by and written to removable storage drive 614. As will be appreciated, the removable storage unit 618 includes a computer usable storage medium having stored therein computer software and/or data.

Alternative aspects of the present disclosure may include secondary memory 610 and may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 618, a hard disk installed in hard disk drive 612, and signals 628. These computer program products provide software to the computer system 600. Aspects of the present disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features in accordance with aspects of the present disclosure, as discussed herein. In particular, the computer programs, when executed, enable the processor 604 to perform the features in accordance with aspects of the present disclosure. Accordingly, such computer programs represent controllers of the computer system 600.

In an aspect of the present disclosure where the disclosure is implemented using software, the software may be stored in a computer program product and loaded into computer system 600 using removable storage drive 614, hard drive 612, or communications interface 620. The control logic (software), when executed by the processor 604, causes the processor 604 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the above-mentioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A method for preventing spoofing of vehicle identification number (VIN) provisioning service by a vehicle manufacturing system, the method comprising:
receiving, from a mobile device or a vehicle, enrollment information to enroll the vehicle in a provisioning service, the enrollment information including a VIN and a hardware identifier of a hardware device of the vehicle;
verifying that the VIN is associated with the hardware identifier through a comparison of the VIN and the hardware identifier to stored manufacturing data;
transmitting an error message to one or more of the mobile device or the vehicle in response to the VIN not being associated with the hardware identifier; and
transmitting a verification code to the vehicle to confirm enrollment in the provisioning service in response to the VIN being associated with the hardware identifier.

2. The method of claim 1, wherein the hardware identifier is a unique identifier associated with the hardware device.

3. The method of claim 2, wherein the hardware device is an onboard communication device of the vehicle.

4. The method of claim 1, wherein the enrollment information further includes information associated with a user of the vehicle.

5. The method of claim 1, further comprising:
receiving a confirmation message in response to the transmitting the verification code, wherein the confirmation message verifies association of a user and the vehicle; and
activating the provisioning service in response to the receiving the confirmation message.

6. The method of claim 1, further comprising determining whether the VIN has previously been associated with the provisioning service.

7. A vehicle manufacturer system comprising:
a memory that stores instructions preventing spoofing of vehicle identification number (VIN) provisioning service; and
a processor configured to execute the instructions, wherein the instructions cause the processor to:
receive, from a mobile device or a vehicle, enrollment information to enroll the vehicle in a provisioning service, the enrollment information including a VIN and a hardware identifier of a hardware device of the vehicle;
verify that the VIN is associated with the hardware identifier through a comparison of the VIN and the hardware identifier to stored manufacturing data;
transmit an error message to one or more of the mobile device or the vehicle in response to the VIN not being associated with the hardware identifier; and
transmit a verification code to the vehicle to confirm enrollment in the provisioning service in response to the VIN being associated with the hardware identifier.

8. The vehicle manufacturer system of claim 7, wherein the hardware identifier is a unique identifier associated with the hardware device.

9. The vehicle manufacturer system of claim 8, wherein the hardware device is an onboard communication device of the vehicle.

10. The vehicle manufacturer system of claim 7, wherein the enrollment information further includes information associated with a user of the vehicle.

11. The vehicle manufacturer system of claim 7, wherein the instructions further cause the processor to:
receive a confirmation message in response to the verification code being transmitted, wherein the confirmation message verifies association of a user and the vehicle; and
activate the provisioning service in response to the confirmation message being received.

12. The vehicle manufacturer system of claim 7, wherein the instructions further cause the processor to determine whether the VIN has previously been associated with the provisioning service.

13. A method for preventing spoofing of vehicle identification number (VIN) provisioning service by a vehicle manufacturing system, the method comprising:
receiving, from a vehicle, a hardware replacement signal indicating a removal of an old hardware device from the vehicle and replacement of a new hardware device in the vehicle;
blocking all provisioning services to a vehicle system of the vehicle in response to receiving the hardware replacement signal;
performing a communication check to communicate with the new hardware device;
verifying a VIN of the vehicle and a unique hardware identity of the new hardware device; and
activating one or more of the provisioning services based on the unique hardware identity being verified.

14. The method of claim 13, wherein the performing of the communication check comprises requesting for one or more of the VIN or the unique hardware identity.

15. The method of claim 13, further comprising transmitting the VIN and the unique hardware identity to a third party provider, and requesting the third party provider to perform the communication check.

* * * * *